(12) United States Patent
Kuboki et al.

(10) Patent No.: US 10,655,919 B2
(45) Date of Patent: May 19, 2020

(54) COOLING MEMBER AND POWER STORAGE MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Makoto Higashikozono, Yokkaichi (JP); Akihisa Hosoe, Osaka (JP); Yoshiyuki Hirose, Osaka (JP); Tomoharu Takeyama, Osaka (JP); Eiichi Kobayashi, Osaka (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 14 days.

(21) Appl. No.: 16/082,582

(22) PCT Filed: Mar. 8, 2017

(86) PCT No.: PCT/JP2017/009161
§ 371 (c)(1),
(2) Date: Sep. 6, 2018

(87) PCT Pub. No.: WO2017/159478
PCT Pub. Date: Sep. 21, 2017

(65) Prior Publication Data
US 2019/0120565 A1 Apr. 25, 2019

(30) Foreign Application Priority Data

Mar. 16, 2016 (JP) .................................. 2016-052290

(51) Int. Cl.
*H01M 10/6557* (2014.01)
*H01G 11/18* (2013.01)
(Continued)

(52) U.S. Cl.
CPC ............... *F28D 15/02* (2013.01); *H01G 2/08* (2013.01); *H01G 11/18* (2013.01);
(Continued)

(58) Field of Classification Search
None
See application file for complete search history.

(56) References Cited

U.S. PATENT DOCUMENTS 7,913,748 B2 3/2011 Lin et al.
9,220,184 B2 * 12/2015 Ranjan ............... H05K 7/20336
(Continued)

FOREIGN PATENT DOCUMENTS

JP H1123169 A 1/1999
JP 2003042675 A 2/2003
(Continued)

OTHER PUBLICATIONS

International Search Report and Written Opinion for Application No. PCT/JP2017/009161 dated May 23, 2017; 6 pages.
(Continued)

*Primary Examiner* — Tracy M Dove
(74) *Attorney, Agent, or Firm* — Reising Ethington, P.C.

(57) ABSTRACT

An enclosing member including a sheet member connected in a liquid tight manner, refrigerant enclosed in the enclosing member, and an absorbing member arranged in the enclosing member and absorbing the refrigerant. The enclosing
(Continued)

member includes a condensation section where the refrigerant that is in a gaseous state is condensed, and in the condensation section, the absorbing member is attached on at least a lower section of an inner surface of the enclosing member with respect to a vertical direction.

14 Claims, 7 Drawing Sheets

(51) Int. Cl.
    *F28D 15/02*     (2006.01)
    *H01G 2/08*     (2006.01)
    *H01M 10/6552*     (2014.01)
    *H01M 10/613*     (2014.01)

(52) U.S. Cl.
    CPC ..... *H01M 10/613* (2015.04); *H01M 10/6552* (2015.04); *H01M 10/6557* (2015.04)

(56) References Cited

U.S. PATENT DOCUMENTS

2003/0014982 A1*   1/2003   Smith .................. C09K 5/047
                                                                           62/106
2009/0294104 A1   12/2009   Lin et al.

FOREIGN PATENT DOCUMENTS

| JP | 2010002125 A | 1/2010 |
|---|---|---|
| JP | 2012132582 A | 7/2012 |
| JP | 2014056690 A | 3/2014 |
| JP | 2015232976 A | 12/2015 |

OTHER PUBLICATIONS

Written Opinion of International Search Authority dated May 23, 2017; 4 pages.

English Translation for Written Opinion of International Search Authority dated May 23, 2017; 3 pages.

\* cited by examiner

*Figure 3*
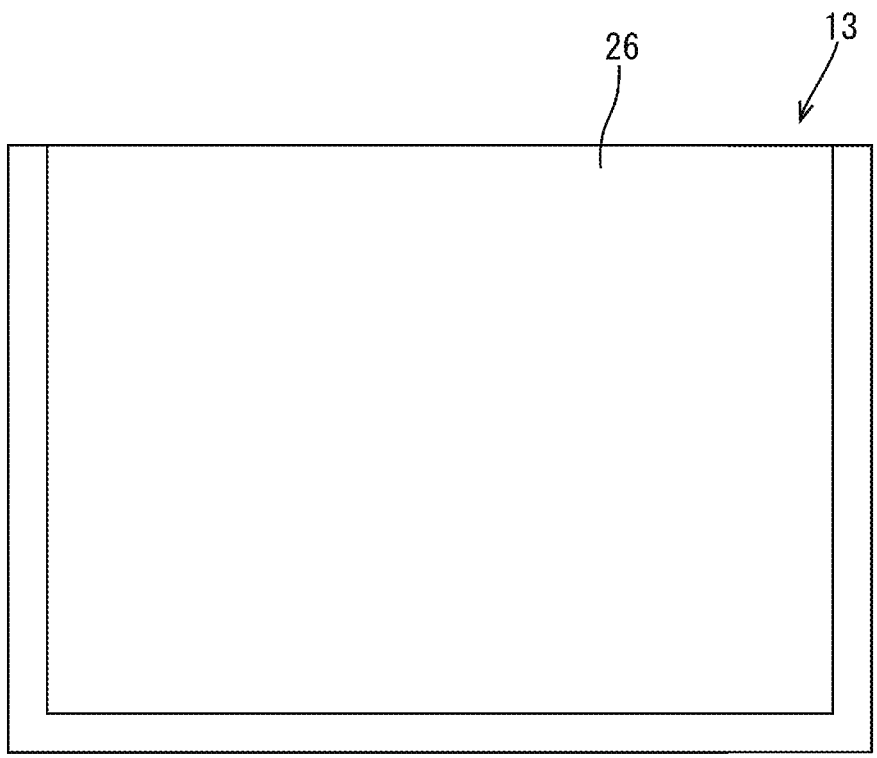
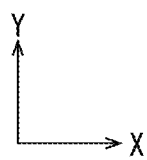

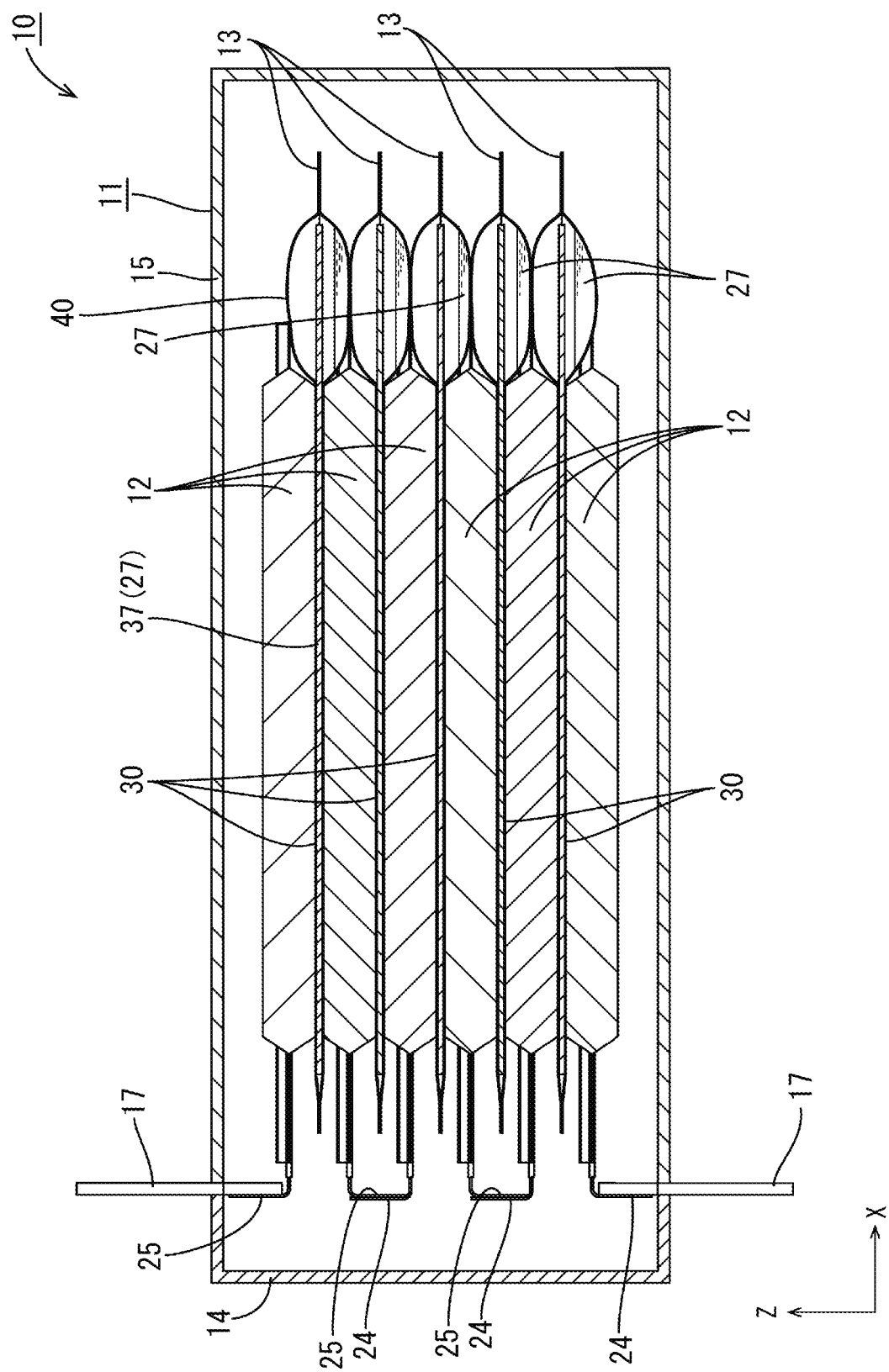

COOLING MEMBER AND POWER STORAGE MODULE

CROSS REFERENCE TO RELATED APPLICATIONS

This application claims the priority of Japanese patent application JP2016-052290 filed on Mar. 16, 2016, the entire contents of which are incorporated herein.

TECHNICAL FIELD

The technology described in this specification relates to a cooling member and a power storage module.

BACKGROUND ART

A cooling member (such as a heat pipe) described in Patent Document 1 (Japanese Unexamined Patent Application Publication No. JP2011-23169) has been known. Such a heat pipe includes a pipe made of metal and heat transfer fluid that is enclosed in the pipe in a liquid tight manner.

According to the above configuration, the pipe is required to be strong to have the heat transfer fluid therein. If the heat transfer fluid receives heat from heat generator and is evaporated, a volume of the heat transfer fluid increases and pressure within the pipe increases. A manufacturing cost is increased to enclose the heat transfer fluid within the pipe in a liquid tight manner and use a pipe having relatively great strength.

As an assumptive technology for solving the above problem, a following cooling member has been proposed. The cooling member may include an enclosing member including sheet members that are connected in a liquid tight manner, refrigerant enclosed in the enclosing member, and an absorbing member arranged in the enclosing member and absorbing the refrigerant.

However, according to such an assumptive technology, if the refrigerant is evaporated, the pressure within the enclosing member increases and the sheet members are expanded. Then, the refrigerant that is in a liquid state may remain in the expanded sheet members. The refrigerant remaining in the sheet members does not work for cooling performance and cooling properties of the cooling member may be lowered.

The present technology described in this specification has been completed in view of the circumstances described above. It is an object of the present technology to improve cooling properties of a cooling member.

SUMMARY

The technology described in this specification is a cooling member including an enclosing member including a sheet member connected in a liquid tight manner, refrigerant enclosed in the enclosing member, and an absorbing member arranged in the enclosing member and absorbing the refrigerant. The enclosing member includes a condensation section where the refrigerant that is in a gaseous state is condensed, and in the condensation section, the absorbing member is attached on at least a lower section of an inner surface of the enclosing member with respect to a vertical direction.

According to the above configuration, if the refrigerant that is in a gaseous state moves to the condensation section, the section of the enclosing member corresponding to the condensation section is expanded. Then, the refrigerant that is turned into liquid flows into the lower section of the expanded section with respect to the vertical direction. The absorbing member is attached on at least the lower section of the inner surface of the enclosing member in the expanded section with respect to the vertical direction and therefore, the refrigerant that is in a liquid state is absorbed by the absorbing member. As a result, the refrigerant that is in a liquid state is less likely to remain in the condensation section. Accordingly, the refrigerant that does not work for cooling is less likely to be present and the cooling efficiency of the cooling member can be improved.

According to the present technology described in this specification, cooling properties of a cooling member can be improved.

BRIEF DESCRIPTION OF THE DRAWINGS

FIG. 3 is a plan view illustrating the absorbing member.

FIG. 7 is a cross-sectional view illustrating a power storage module according to an assumptive technology.

MODES FOR CARRYING OUT THE INVENTION

First Embodiment

A first embodiment according to a technology described in this specification will be described with reference to FIGS. 1 to 4. A power storage module 10 according to this embodiment includes a casing 11, power storage elements 12 arranged in the casing 11, and cooling members 13 that are arranged in the casing 11 and in contact with a part of an outer surface of each of the power storage elements 12. In the following description, an X direction represents a right side, a Y direction represents a front side, and a Z direction represents an upper side. Symbols or numerals are put on one or some of the parts having the same shape and no symbols or numerals may be put on the rest of them.

The power storage module 10 is arranged such that a stacking direction in which the power storage elements 12 and the cooling members 13 are arranged faces an upper side. The upper side may be an upper side in a vertical direction or may be substantially a vertical upper side.

Figure 1:
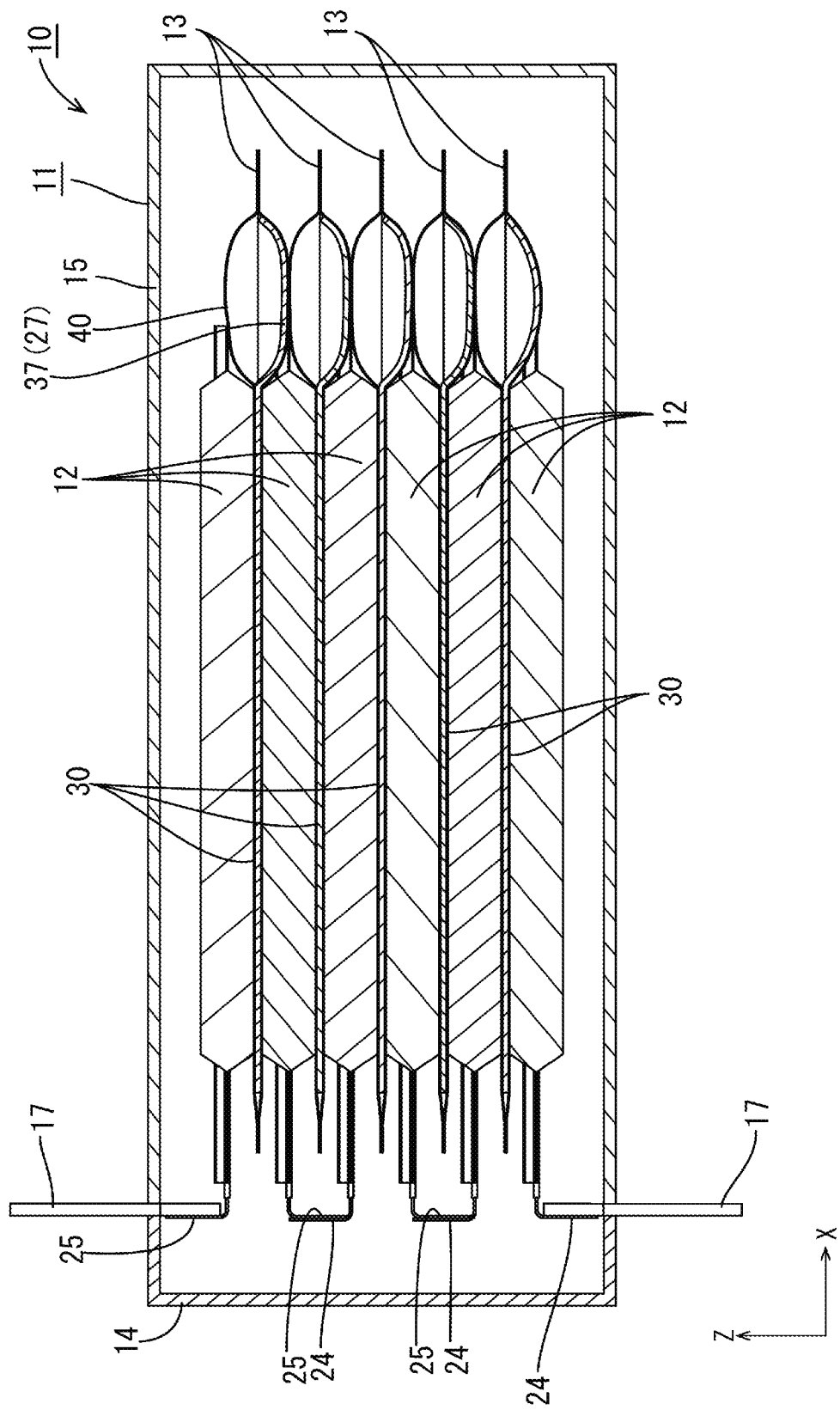
FIG. 1 is a cross-sectional view illustrating a power storage module according to a first embodiment.

As illustrated in FIG. 1, the casing 11 is a substantially rectangular parallelepiped shape as a whole. The casing 11 includes a first case 14 and a second case 15. The first case 14 is open toward a right side and has a substantially rectangular shape seen from the right side. The second case 15 is mounted on a right side with respect to the first case 14 and has a substantially rectangular cross-sectional shape and has a box shape opening toward a left side. A left side end of the second case 15 has a shape following that of a right side end of the first case 14.

The first case 14 and the second case 15 may be made of any material such as synthetic resin or metal. The first case 14 and the second case 15 may be made of different materials or the same material.

The first case 14 and the second case 15 may be connected with a known method such as a locking structure including a locking member and an locked member, a screwing structure, and bonding with adhesive. The first case 14 and the second case 15 that are made of metal may be connected with a known method such as laser welding and brazing. In this embodiment, the first case 14 and the second case 15 are not connected in a liquid tight manner. However, the first case 14 and the second case 15 may be connected in a liquid tight manner.

A pair of power terminals 17 are mounted on a left end side section of the casing 11 and one of them projects upward and the other projects downward. The power terminals 17 are formed of a metal plate.

The power storage element 12 includes a pair of battery laminating sheets and a power storage component, which is not illustrated, between the laminating sheets, and edge sections of the battery laminating sheets are bonded in a liquid tight manner with a known method such as heat-welding. As illustrated in FIG. 1, a positive terminal 24 and a negative terminal 25 that are formed of a thin metal foil extend from an inside to an outside of the battery laminating sheets while being in contact with inner surfaces of the battery laminating sheets in a liquid tight manner. The positive terminals 24 and the negative terminals 25 project from left ends of the power storage elements 12 and are arranged in a front-rear direction at intervals. The positive terminals 24 and the negative terminals 25 are electrically connected to the power storage components, respectively.

As illustrated in FIG. 1, the power storage elements 12 (six in this embodiment) are arranged in an up-down direction. The power storage elements 12 arranged adjacent in the up-down direction include one positive terminal 24 next to another negative terminal 25 and one negative terminal 25 next to another positive terminal 24. The positive terminal 24 and the negative terminal 25 that are next to each other are bent to be closer to each other and overlapped with each other and the positive terminal 24 and negative terminal 25 that are overlapped in a right-left direction are electrically connected to each other with a known method such as laser welding, ultrasonic welding, and brazing. Thus, the power storage elements 12 are connected in series.

In this embodiment, secondary batteries such as lithium ion secondary batteries and nickel hydride batteries or capacitors such as electric double layer capacitors and lithium ion capacitors may be used as the power storage elements 12, and any power storage elements 12 can be used as appropriate.

The cooling member 13 includes refrigerant 27 and an enclosing member 26 that is formed in a liquid tight manner and the refrigerant 27 is enclosed inside the enclosing member 26. An amount of the refrigerant 27 enclosed in the enclosing member 26 is determined as appropriate. In this embodiment, the refrigerant 27 is absorbed by an absorbing member 37, which will be described later, and the symbol representing the refrigerant 27 illustrates the absorbing member 37. One or some may be selected from a group of perfluorocarbon, hydrofluoroether, hydrofluoroketone, fluorine inert liquid, water, and alcohol such as methanol and ethanol can be used as the refrigerant 27. The refrigerant 27 may have an insulating property or may have conductivity. The cooling member 13 has a length dimension in the right-left direction that is greater than the length dimension of the power storage element 12.

As illustrated in FIG. 3, the enclosing member 26 is formed by folding a sheet member 32 having a substantially rectangular shape elongated in the front-rear direction at a substantially middle position with respect to the front-rear direction and connecting the side edges of the sheet member 32 in a liquid tight manner with a known method such as bonding, deposition, or welding.

The sheet member 32 includes a metal sheet 33 and a synthetic resin film 34 disposed on a surface of the metal sheet 33. Any metal such as aluminum, aluminum alloy, copper, or copper alloy may be selected as appropriate as the metal of the metal sheet 33. Any synthetic resin such as polyolefin such as polyethylene and polypropylene, polyester such as polybutylene terephthalate and polyethylene terephthalate, and polyamide such as nylon 6 and nylon 6, 6 may be selected as appropriate as the synthetic resin of the synthetic resin film.

The enclosing member 26 of this embodiment is obtained by overlapping surfaces of the sheet member 32 having the synthetic resin film 34 thereon and bonding the films with heat-welding.

The enclosing member 26 has a contact section 30 on an outer surface thereof and the contact section 30 is in contact with the power storage element 12 to transfer heat therebetween.

The cooling member 13 includes a condensation section 40 at a projected section thereof projecting rightward from the power storage element 12. The refrigerant 27 that is in a gaseous state is condensed and changed to liquid with phase transition in the condensation section 40. In the condensation section 40, the refrigerant 27 that is in a gaseous state and has relatively high temperature dissipates heat and is changed to liquid with phase transition within the enclosing member 26. The released heat of condensation is transferred to the sheet member 32 and the heat dissipates from the outer surface of the sheet member 32 to the outside of the cooling member 13.

The absorbing member 37 is arranged inside the enclosing member 26. The absorbing member 37 is a substantially rectangular sheet.

The absorbing member 37 is made of material that can absorb the refrigerant 27. The absorbing member 37 may be formed of a cloth obtained by processing material that can absorb the refrigerant 27 into fibers or may be formed of a non-woven cloth. Examples of the non-woven cloth may include a fiber sheet, web (a thin film sheet made of only fibers), and batt (fibers of blanket). The material of the absorbing member 37 may be natural fibers or synthetic fibers made of synthetic resin or may include both of the natural fibers and the synthetic fibers.

The absorbing member 37 is preferably prepared as follows. When sixty seconds has elapsed after a lower end portion of the absorbing member 37, which is disposed in a vertical position, is immersed in the refrigerant 27, the refrigerant 27 spreads within the absorbing member 37 such that a distance (a height dimension) between an upper end of the refrigerant 27 and a liquid surface of the refrigerant 27 is preferably 5 mm or more. According to such a configuration, the absorbing properties of the refrigerant 27 is improved and cooling properties of the cooling member 13 can be improved.

The absorbing member 37 is disposed in the enclosing member 26 over an area substantially equal to or larger than that of the contact section 30 of the enclosing member 26. In this embodiment, the absorbing member 37 is disposed within the enclosing member 26 over an area larger than that of the contact section 30.

Figure 2:
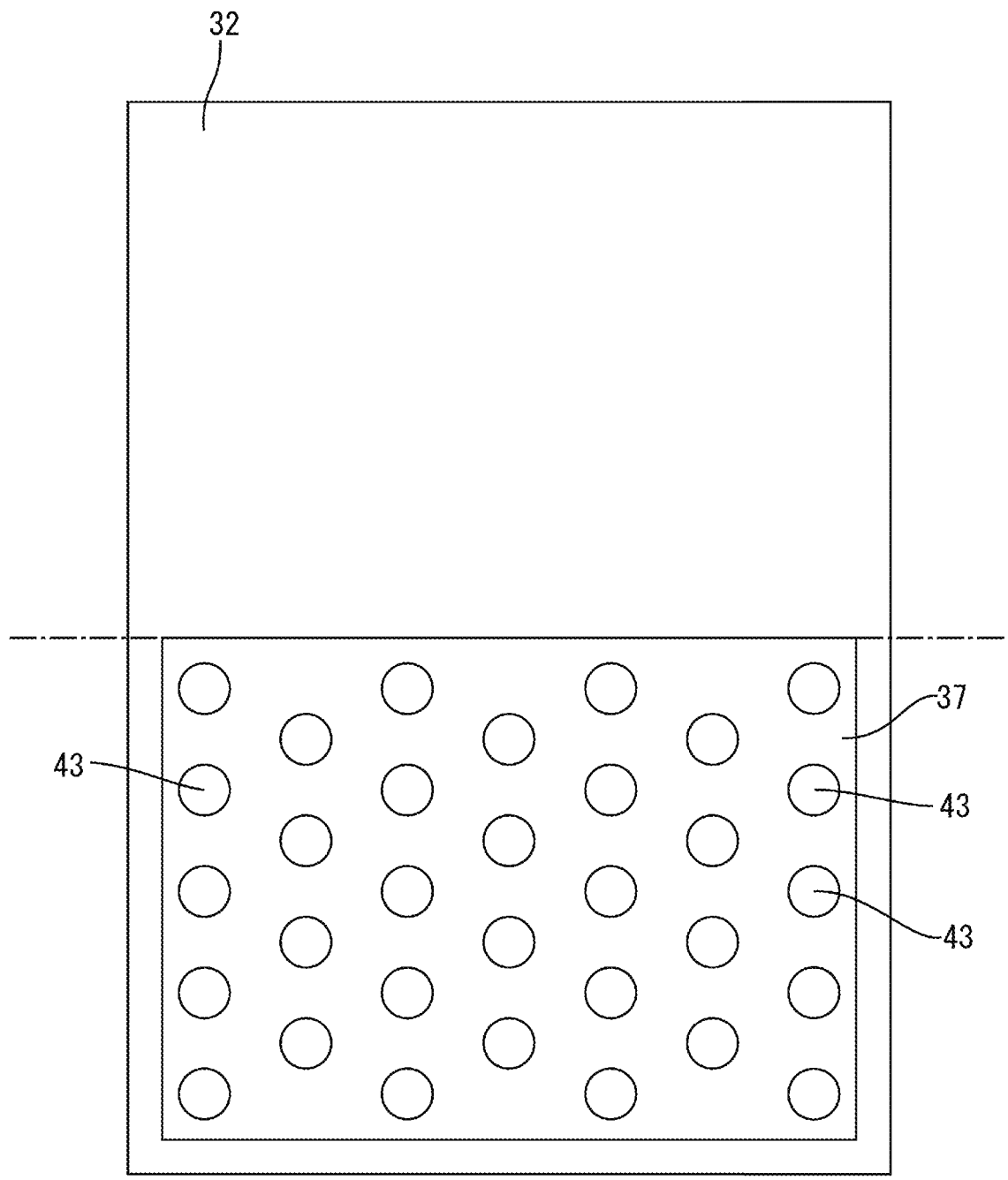
FIG. 2 is a plan view illustrating a process of manufacturing an absorbing member.
Figure 4:
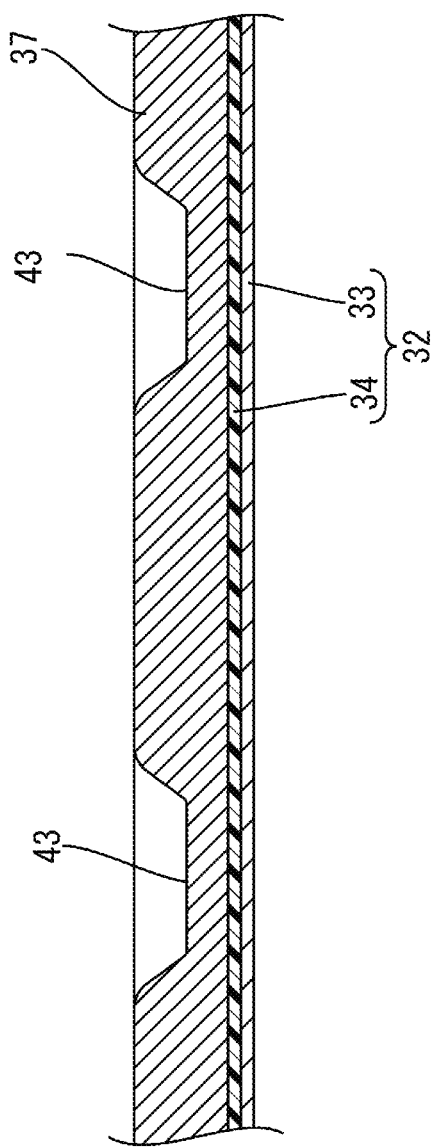
FIG. 4 is an enlarged cross-sectional view illustrating a part of the absorbing member.

As illustrated in FIGS. 2 and 4, the absorbing member 37 and the sheet member 32 are bonded with heat-welding at heat-welding sections 43 dispersedly included in the absorbing member 37. In detail, the absorbing member 37 and the film 34 of the sheet member 32 are heated and bonded with heat-welding at the heat-welding sections 43.

The heat-welding sections 43 are formed dispersedly and therefore, the absorbing member 37 includes sections that can absorb the refrigerant 27 in different portions from the heat-welding sections 43.

As illustrated in FIG. 1, in the condensation section 40, the absorbing member is attached on a lower section of the inner surface of the enclosing member 26 with respect to a vertical direction.

The absorbing member is attached on the sheet member 32. Therefore, if the sheet member 32 is deformed, the absorbing member is also deformed according to the deformation of the sheet member 32.

Operations and Effects of Embodiment

Problems in the assumptive technology will be described with reference to FIG. 7 before describing operations and effects of this embodiment. Symbols or numerals on the parts in FIG. 7 are same as those on the parts of the embodiment as long as it is not especially mentioned. Following problems may be caused if the casing 11 of the power storage module 10 is horizontally arranged as illustrated in FIG. 7.

Heat generated in the power storage element 12 is transferred to the cooling member 13 and transferred to the refrigerant 27 enclosed within the cooling member 13 and then, the refrigerant 27 is evaporated and made into gas. This increases the pressure inside the enclosing member 26. Then, the sheet member 32 is deformed to increase the volume of the enclosing member 26. Especially, in the section of the cooling member 13 that is not sandwiched by the power storage elements 12, the enclosing member 26 expands.

The vaporized refrigerant 27 is liquefied in the section where the enclosing member 26 expands and flows downward. Then, the liquefied refrigerant 27 remains in a lower portion of the expansion section of the enclosing member 26. The refrigerant 27 cannot return to the contact section 30 where the power storage element 12 and the cooling member 13 are contacted to transfer heat therebetween. Therefore, the remaining refrigerant 27 cannot work for cooling the power storage element 12. If such refrigerant 27 remains in each of the cooling members 13, the cooling efficiency of the cooling member 13 may be lowered.

To solve the above problems, the power storage module 10 according to the technology described in this specification includes a following configuration. The power storage module 10 includes the enclosing member 26 including the sheet member 32 bonded in a liquid tight manner, the refrigerant 27 enclosed in the enclosing member 26, and the absorbing member 37 arranged in the enclosing member 26 and absorbing the refrigerant 27. The enclosing member 26 includes the condensation section 40 where the refrigerant 27 that is in a gaseous state is condensed and the absorbing member 37 is attached on at least a lower section of the inner surface of the enclosing member 26 with respect to a vertical direction in the condensation section 40.

According to the above configuration, if the refrigerant 27 that is in a gaseous state moves to the condensation section 40, the section of the enclosing member 26 corresponding to the condensation section 40 is expanded. Then, the refrigerant 27 that is turned into liquid flows into the lower section of the expanded section with respect to the vertical direction. The absorbing member 37 is attached on at least the lower section of the inner surface of the enclosing member 26 in the expanded section with respect to the vertical direction and therefore, the refrigerant 27 that is in a liquid state is absorbed by the absorbing member 37. As a result, the refrigerant 27 that is in a liquid state is less likely to remain in the condensation section 40. Accordingly, the refrigerant 27 that does not work for cooling is less likely to be present and the cooling efficiency of the cooling member 13 can be improved.

The power storage module 10 of this embodiment includes the cooling member 13, and the power storage element 12 including an outer surface at least a part of which is in contact with the cooling member 13.

According to the above configuration, the power storage element 12 can be cooled down effectively by the cooling member 13.

Second Embodiment

Next, a power storage module according to a second embodiment will be described with reference to FIGS. 5 and 6. In this embodiment, the absorbing member 37 is disposed on an entire inner surface of the sheet member 32 except for the sections of the sheet member 32 that are bonded to each other. The absorbing member 37 is bonded on the sheet member 32 with heat-welding.

Figure 5:
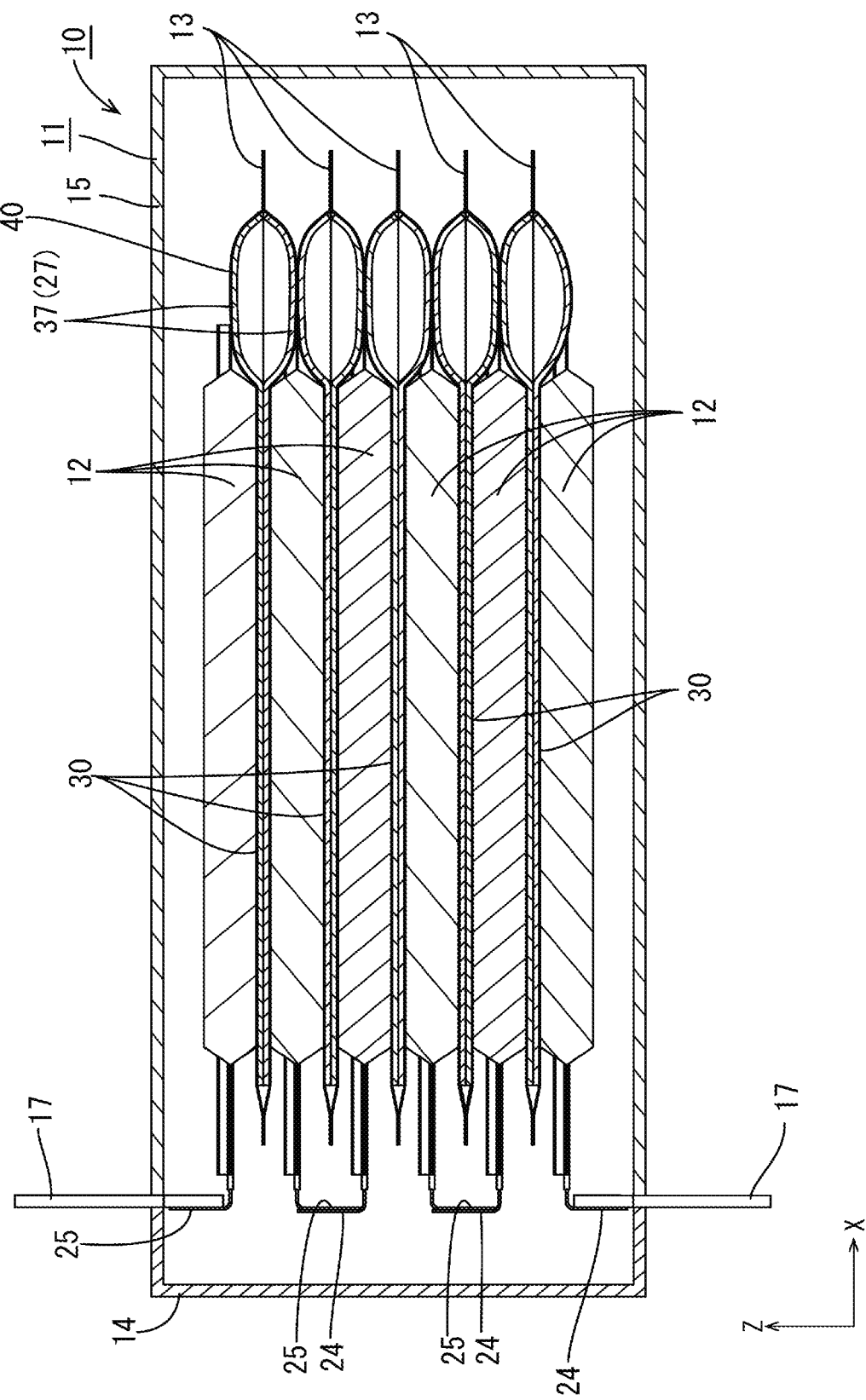
FIG. 5 is a cross-sectional view illustrating a power storage module according to a second embodiment.
Figure 6:
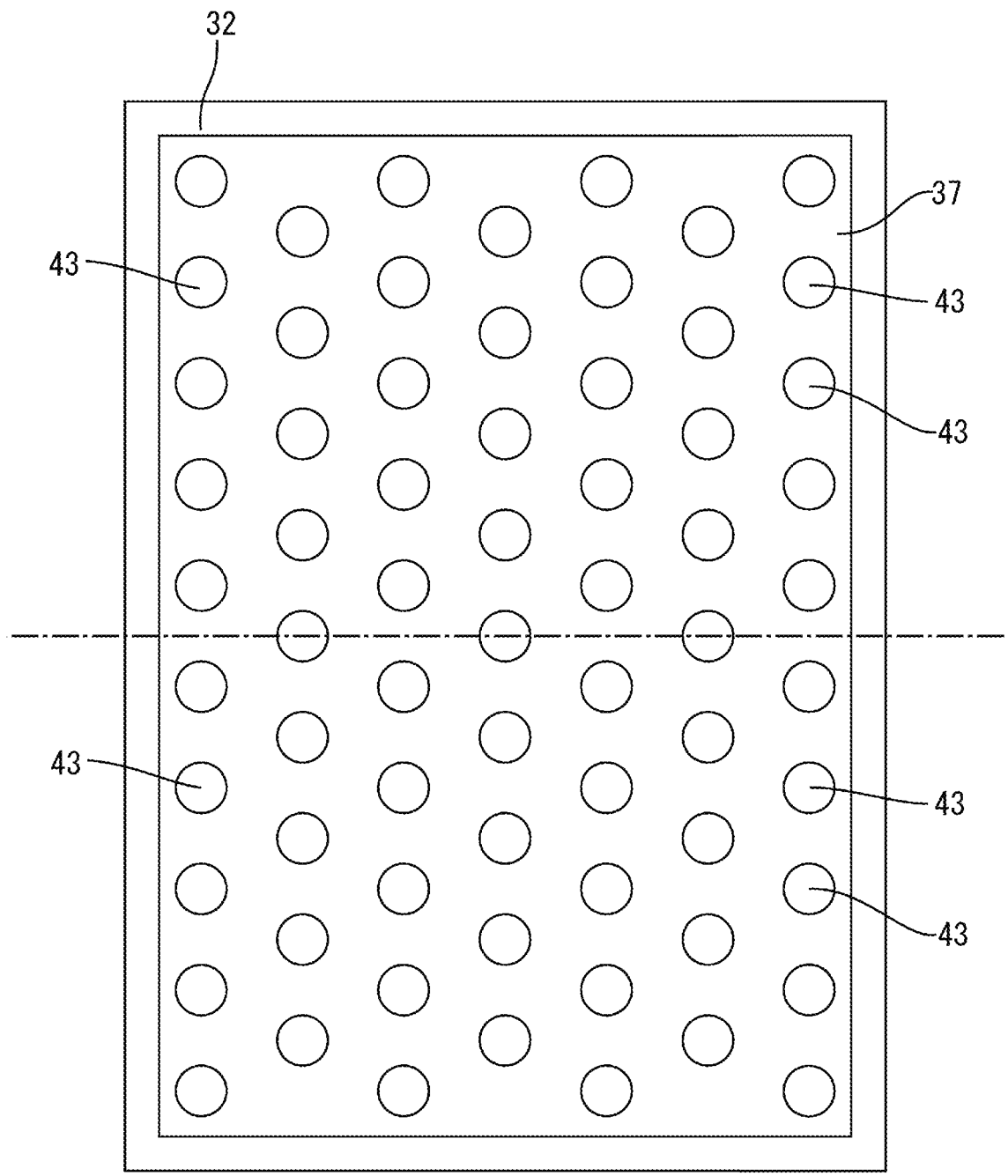
FIG. 6 is a plan view illustrating a process of manufacturing an absorbing member.

According to the above configuration, as illustrated in FIG. 5, the absorbing member 37 is also attached on an upper section of the inner surface of the enclosing member 26 with respect to the vertical direction in the condensation section 40.

Configurations other than the above are substantially same as those of the first embodiment and the same symbols are put on the same parts and they will not be described.

According to this embodiment, in the condensation section 40, the absorbing member 37 is attached on the upper section of the inner surface of the enclosing member with respect to the vertical direction.

According to the above configuration, the refrigerant 27 that is turned into liquid in the upper section of the inner surface of the enclosing member 26 with respect to the vertical direction is promptly absorbed by the absorbing member 37. Accordingly, the refrigerant that does not work for cooling is not present and therefore, the cooling efficiency of the cooling member 13 can be further improved.

In this embodiment, the absorbing member 37 is bonded on an entire inner surface of the enclosing member 26.

According to the above configuration, the positioning of the sheet member 32 and the absorbing member 37 is easy and the process of manufacturing the enclosing member 26 can be simplified.

Other Embodiments

Following configurations may be preferable for embodiments of the technology described in this specification.

In the condensation section, the absorbing member may be attached on an upper section of the inner surface of the enclosing member with respect to a vertical direction.

According to the above configuration, the refrigerant that is turned into liquid in the upper section of the inner surface of the enclosing member with respect to the vertical direction is promptly absorbed by the absorbing member. Accordingly, the refrigerant that does not work for cooling is not present and therefore, the cooling efficiency of the cooling member can be further improved.

The absorbing member may be attached on an entire inner surface of the enclosing member.

According to the above configuration, the positioning of the sheet member and the absorbing member is easy and the process of manufacturing the enclosing member can be simplified.

The technology described in this specification is a power storage module including the above cooling member, and a power storage element having an outer surface at least a part of which is in contact with the cooling member.

According to the technology described in this specification, the cooling efficiency of the cooling member can be improved.

The present technology described in this specification is not limited to the embodiments, which have been described using the foregoing descriptions and the drawings. For example, embodiments described below are also included in the technical scope of the present technology described in this specification.

In the first embodiment, the sheet member 32 of the cooling member 13 is a laminating film including the metal sheet 33 and synthetic resin layered on one surface of the metal sheet. However, the configuration of the sheet member 32 may not be limited thereto. The sheet member 32 may be configured such that synthetic resin is layered on both surfaces of the metal sheet 33 or the sheet member 32 may be formed of the metal sheet 33. The sheet member 32 can be connected in a liquid tight manner with bonding, welding, and brazing. The sheet member 32 may be formed of a synthetic resin sheet. Any synthetic resin such as polyolefin such as polyethylene and polypropylene, polyester such as polybutylene terephthalate and polyethylene terephthalate, and polyamide such as nylon 6 and nylon 6, 6 may be selected as appropriate as the synthetic resin of the synthetic resin film.

In the above embodiments, one absorbing member 37 is arranged in the enclosing member 26. However, it is not limited thereto and two or more absorbing members 37 may be arranged in the enclosing member 26.

In the above embodiments, the absorbing member is connected to the sheet member 32 with heat-welding. However, it is not limited thereto and the absorbing member may be adhesively bonded to the sheet member 32.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

EXPLANATION OF SYMBOLS

10: power storage module
12: power storage element
13: cooling member
26: enclosing member
27: refrigerant
37: absorbing member
40: condensation section
43: heat-welding section

The invention claimed is:

1. A cooling member comprising:
an enclosing member including one or more sheet members defining a liquid tight enclosure, the enclosure including a contact section configured to receive a heat transfer from a component cooled by the cooling member;
refrigerant enclosed in the enclosure of the enclosing member; and
an absorbing member arranged in the enclosure of the enclosing member and absorbing the refrigerant, wherein
the enclosing member includes a condensation section where the refrigerant that is in a gaseous state is condensed, the condensation section of the enclosing member being laterally shifted from the contact section, and
in the condensation section, the absorbing member is attached on at least a lower section of an inner surface of the enclosure of the enclosing member with respect to a vertical direction, the absorbing member extending from the condensation section laterally and vertically upward into the contact section, such that the absorbing member conducts absorbed liquid refrigerant from the condensation section laterally and vertically upward to the contact section.

2. The cooling member according to claim 1, wherein in the condensation section, the absorbing member is further attached on an upper section of the inner surface of the enclosure of the enclosing member with respect to the vertical direction.

3. The cooling member according to claim 1, wherein the absorbing member is attached on an entire inner surface of the enclosure of the enclosing member.

4. A power storage module comprising:
the cooling member according to claim 1; and
a power storage element having an outer surface at least a part of which is in contact with the cooling member.

5. The cooling member according to claim 2, wherein the absorbing member surrounds an interior of the condensation section of the cooling member.

6. The cooling member according to claim 3, wherein the absorbing member surrounds an interior of the condensation section of the cooling member.

7. The power storage module according to claim 4, wherein the part of the outer surface of the power storage element is in contact with the contact section of the cooling member.

8. A cooling member comprising:
an enclosing member including one or more sheet members defining a liquid tight enclosure, the enclosure including a contact section configured to receive a heat transfer from a component cooled by the cooling member, the sheet member including a metal sheet and a synthetic resin film disposed on a surface of the metal sheet;

refrigerant enclosed in the enclosure of the enclosing member; and an absorbing member arranged in the enclosure of the enclosing member and absorbing the refrigerant, the absorbing member including synthetic fibers, wherein the absorbing member and the sheet member are bonded together with heat-welds provided at heat weld sections, the heat-weld sections dispersedly included in the absorbing member, the enclosing member includes a condensation section where the refrigerant that is in a gaseous state is condensed, the condensation section of the enclosing member being laterally shifted from the contact section, and in the condensation section, the absorbing member is attached on at least a lower section of an inner surface of the enclosure of the enclosing member with respect to a vertical direction, the absorbing member extending from the condensation section laterally and vertically upward into the contact section, such that the absorbing member conducts absorbed liquid refrigerant from the condensation section laterally and vertically upward to the contact section.

9. The cooling member according to claim 8, wherein in the condensation section, the absorbing member is further attached on an upper section of the inner surface of the enclosure of the enclosing member with respect to the vertical direction.

10. The cooling member according to claim 8, wherein the absorbing member is attached on an entire inner surface of the enclosure of the enclosing member.

11. A power storage module comprising:

the cooling member according to claim 8; and a power storage element having an outer surface at least a part of which is in contact with the cooling member.

12. The cooling member according to claim 9, wherein the absorbing member surrounds an interior of the condensation section of the cooling member.

13. The cooling member according to claim 10, wherein the absorbing member surrounds an interior of the condensation section of the cooling member.

14. The power storage module according to claim 11, wherein the part of the outer surface of the power storage element is in contact with the contact section of the cooling member.

* * * * *